United States Patent
Ito (10) Patent No.: US 10,116,818 B2
(45) Date of Patent: Oct. 30, 2018

(54) INFORMATION PROCESSING APPARATUS WITH OPERATION UNIT, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Keisuke Ito, Abiko (JP)

(73) Assignee: CANON KAUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/811,749

(22) Filed: Nov. 14, 2017

(65) Prior Publication Data

US 2018/0213098 A1 Jul. 26, 2018

(30) Foreign Application Priority Data

Jan. 24, 2017 (JP) .................. 2017-010396

(51) Int. Cl.
*H04N 1/00* (2006.01)
*G06F 3/0481* (2013.01)

(52) U.S. Cl.
CPC ..... *H04N 1/00503* (2013.01); *G06F 3/04817* (2013.01); *H04N 1/0097* (2013.01); *H04N 1/00474* (2013.01); *H04N 2201/0094* (2013.01)

(58) Field of Classification Search
USPC ....................................................... 358/1.13
See application file for complete search history.

(56) References Cited

U.S. PATENT DOCUMENTS

| 8,325,354 | B2 * | 12/2012 | Yoshida | H04N 1/0035 358/1.1 |
| 8,423,911 | B2 * | 4/2013 | Chaudhri | G06F 3/04817 715/835 |
| 2007/0139741 | A1 * | 6/2007 | Takami | H04N 1/00413 358/527 |
| 2013/0321837 | A1 * | 12/2013 | Takai | G06K 15/005 358/1.13 |
| 2016/0370972 | A1 * | 12/2016 | Bouknight, Jr. | G06F 3/04817 |

FOREIGN PATENT DOCUMENTS

JP 2015001985 A 1/2015

* cited by examiner

*Primary Examiner* — Ngon Nguyen
(74) *Attorney, Agent, or Firm* — Rossi, Kimms & McDowell LLP (57) ABSTRACT

An information processing apparatus that is capable of displaying icons that are arranged properly without causing user's time and effort. A display unit displays icons for selecting a function from among mounted functions. A memory device stores a set of instructions. At least one processor executes the instructions to display various icons including a plurality of icons corresponding to a plurality of functions that are extended by installing at least one application in a display area of the display unit, and to collect the plurality of icons corresponding to the plurality of functions extended into a predetermined icon in a case where the number of icons displayed in the display area exceeds a display upper limit.

5 Claims, 11 Drawing Sheets

INFORMATION PROCESSING APPARATUS WITH OPERATION UNIT, CONTROL METHOD THEREFOR, AND STORAGE MEDIUM STORING CONTROL PROGRAM THEREFOR

BACKGROUND OF THE INVENTION

Field of the Invention

The present invention relates to an information processing apparatus with an operation unit, a control method therefor, and a storage medium storing control program therefor.

Description of the Related Art

There is a known MFP as an information processing apparatus quipped with an operation unit. A setting screen for performing various settings of the MFP is displayed on the operation unit. In the setting screen, icons that are used for selecting a function attainable with an application beforehand installed on the MFP are displayed, and the MFP performs a process corresponding to the icon selected in the setting screen. Moreover, an MFP is able to extend a function corresponding to a newly installed extension application that differs from applications installed beforehand. When an extension application is installed, an icon for selecting a function that is extended by installing the extension application is displayed on a setting screen of the MFP in addition to the above-mentioned icons.

Incidentally, the icons are displayed within a limited area in the setting screen of the MFP. Accordingly, since the number of icons that can be displayed on the setting screen is restricted, even if an extension application is installed and a function is extended, an icon for selecting the extended function may not be displayed on the setting screen, which may disable a user from selecting a desired icon. Against this, a conventional technique of collecting a plurality of icons into one by a user's operation on an operation unit is proposed (for example, see Japanese Laid-Open Patent Publication (Kokai) No. 2015-1985 (JP 2015-1985A)). Thereby, the icons on the setting screen are arranged properly, which enables a user to select a desired icon efficiently.

However, the technique of the publication mentioned above needs a user's operation for collecting the icons into one in order to properly arrange the icons on the setting screen, which causes user's time and effort.

SUMMARY OF THE INVENTION

The present invention provides an information processing apparatus, a control method therefor, and a storage medium storing a control program therefor, which are capable of displaying icons that are arranged properly without causing user's time and effort.

Accordingly, a first aspect of the present invention provides an information processing apparatus comprising a display unit that displays icons for selecting a function from among mounted functions, a memory device that stores a set of instructions, and at least one processor that executes the instructions to display various icons including a plurality of icons corresponding to a plurality of functions that are extended by installing at least one application in a display area of the display unit, and to collect the plurality of icons corresponding to the plurality of functions extended into a predetermined icon in a case where the number of icons displayed in the display area exceeds a display upper limit.

Accordingly, a second aspect of the present invention provides a control method for an image processing apparatus equipped with a display unit, the control method comprising a display step of displaying icons for selecting a function from among mounted functions on the display unit, a display control step of controlling to display various icons including a plurality of icons corresponding to a plurality of functions that are extended by installing at least one application in a display area of the display unit, and a collection step of collecting the plurality of icons corresponding to the plurality of functions extended into a predetermined icon in a case where the number of icons displayed in the display area exceeds a display upper limit.

Accordingly, a third aspect of the present invention provides a non-transitory computer-readable storage medium storing a control program causing a computer to execute the control method of the second aspect.

According to the present invention, icons are displayed in proper arrangement without causing user's time and effort.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
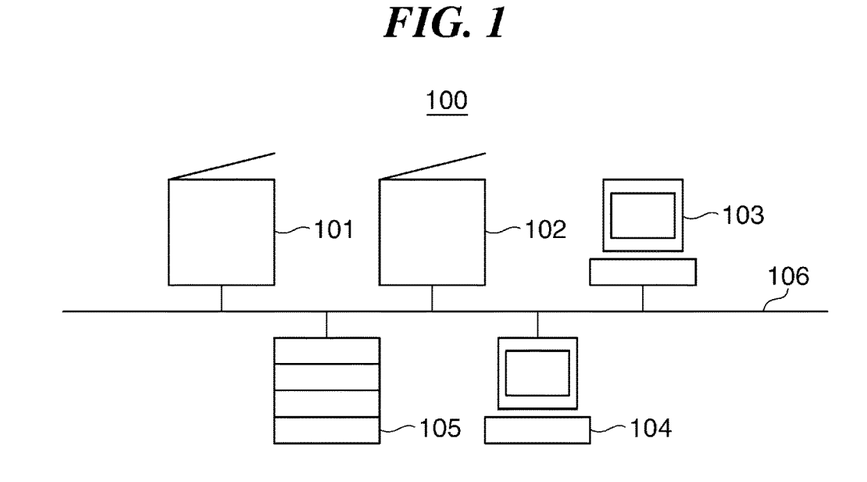
FIG. 1 is a network diagram schematically showing a configuration of an image forming system including an MFP as an information processing apparatus according to an embodiment of the present invention.

FIG. 1 is a network diagram schematically showing a configuration of an image forming system 100 including an MFP 101 as an information processing apparatus according to an embodiment of the present invention.

As shown in FIG. 1, the image forming system 100 is provided with MFPs 101 and 102, client PCs 103 and 104, and a server 105. The MFPs 101 and 102, client PCs 103 and 104, and server 105 are connected via a network 106. Since the MFPs 101 and 102 have the same configuration, the MFP 101 will be described as a representative hereinafter. Moreover, since the client PCs 103 and 104 have the same configuration, the client PC 103 will be described as a representative hereinafter.

The MFP 101 performs various processes using functions attainable by application modules installed beforehand. Hereinafter, an application module is simply referred to as an application, and an application installed beforehand is referred to as a resident application. The MFP 101 is an image forming apparatus that receives a print job, a scan job, etc. and performs image forming processes corresponding to the jobs. For example, the MFP 101 receives a print execution instruction from the client PC 103, receives image data, document data, etc. from the server 105, converts the received data into print data in a predetermined format, and prints according to the print data concerned. Moreover, the MFP 101 reads an image of an original put on an original platen (not shown). The MFP 101 prints the read image or converts the image concerned into image data in a predetermined format and sends the image data to the client PC 103 or the like.

The MFP 101 is able to extend a function corresponding to a newly installed extension application that differs from the resident applications. The client PC 103 instructs the MFP 101 to execute a job. The server 105 stores data required for executing a job, and sends the data to the MFP 101 when the MFP 101 performs the job. Moreover, the server 105 is provided with an image processing function, and performs an image process in response to an execution instruction received from the MFP 101. The network 106 is a communication tool, such as a LAN (Local Area Network) or the Internet, that allows mutual communication between the apparatuses in the image forming system 100.

Figure 2:
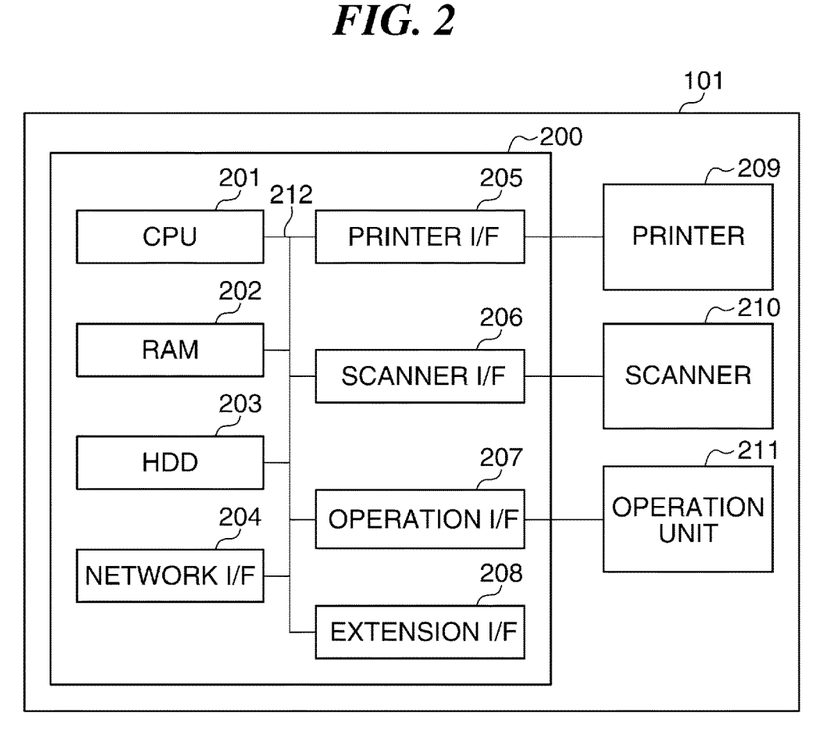
FIG. 2 is a block diagram schematically showing a configuration of the MFP shown in FIG. 1.

Next, the configuration of the MFP 101 will be described. FIG. 2 is a block diagram schematically showing a configuration of the MFP 101 shown in FIG. 1.

As shown in FIG. 2, the MFP 101 is provided with a controller 200, a printer 209, a scanner 210, and an operation unit 211. The controller 200 is connected with the printer 209, the scanner 210, and the operation unit 211. The controller 200 is provided with a CPU 201, a RAM 202, an HDD 203, a network I/F 204, a printer I/F 205, a scanner I/F 206, an operation I/F 207, and an extension I/F 208. The CPU 201, RAM 202, HDD 203, network I/F 204, printer I/F 205, scanner I/F 206, operation I/F 207, and extension I/F 208 are mutually connected via a system bus 212.

The controller 200 integrally controls the entire MFP 101. The CPU 201 performs a process of a software module 300 in FIG. 3 by running a program stored in the HDD 203. The RAM 202 is used as a working area of the CPU 201, and is used as a temporary storage area for data. The HDD 203 stores programs that the CPU 201 runs, set values of the MFP 101, and data about a job, etc. The network I/F 204 performs data communication with the client PCs 103, 104, and the server 105.

The printer I/F 205 performs data communication about execution of print. For example, the printer I/F 205 receives print data from the CPU 201, and sends the print data concerned to the printer 209. Moreover, the printer I/F 205 receives information including a print execution situation from the printer 209, and sends the information to the CPU 201. The scanner I/F 206 performs data communication about execution of scan. For example, the scanner I/F 206 receives an image reading instruction from the CPU 201, and sends the image reading instruction to the scanner 210. Moreover, the scanner I/F 206 receives the image that the scanner 210 read from the scanner 210, and sends the image to the CPU 201.

The operation I/F 207 sends an instruction input by a user's operation through the operation unit 211 to the CPU 201. Moreover, the operation I/F 207 sends data for displaying various screens to the operation unit 211. The extension I/F 208 performs data communication with an external device (not shown) that is connected to the MFP 101. For example, when an external storage, such as a USB memory, is connected to the MFP 101, the extension I/F 208 performs communication for reading and writing data with the external storage. The printer 209 receives print data from the printer I/F 205 and prints according to the print data. When receiving an image reading instruction from the scanner I/F 206, the scanner 210 reads an original put on the platen (not shown). The operation unit 211 is a user interface of the MFP 101. The operation unit 211 is provided with a touch-panel liquid crystal display and a plurality of operation keys, and receives an instruction by a user's touch operation to the touch panel or a user's operation to an operation key.

Figure 3:
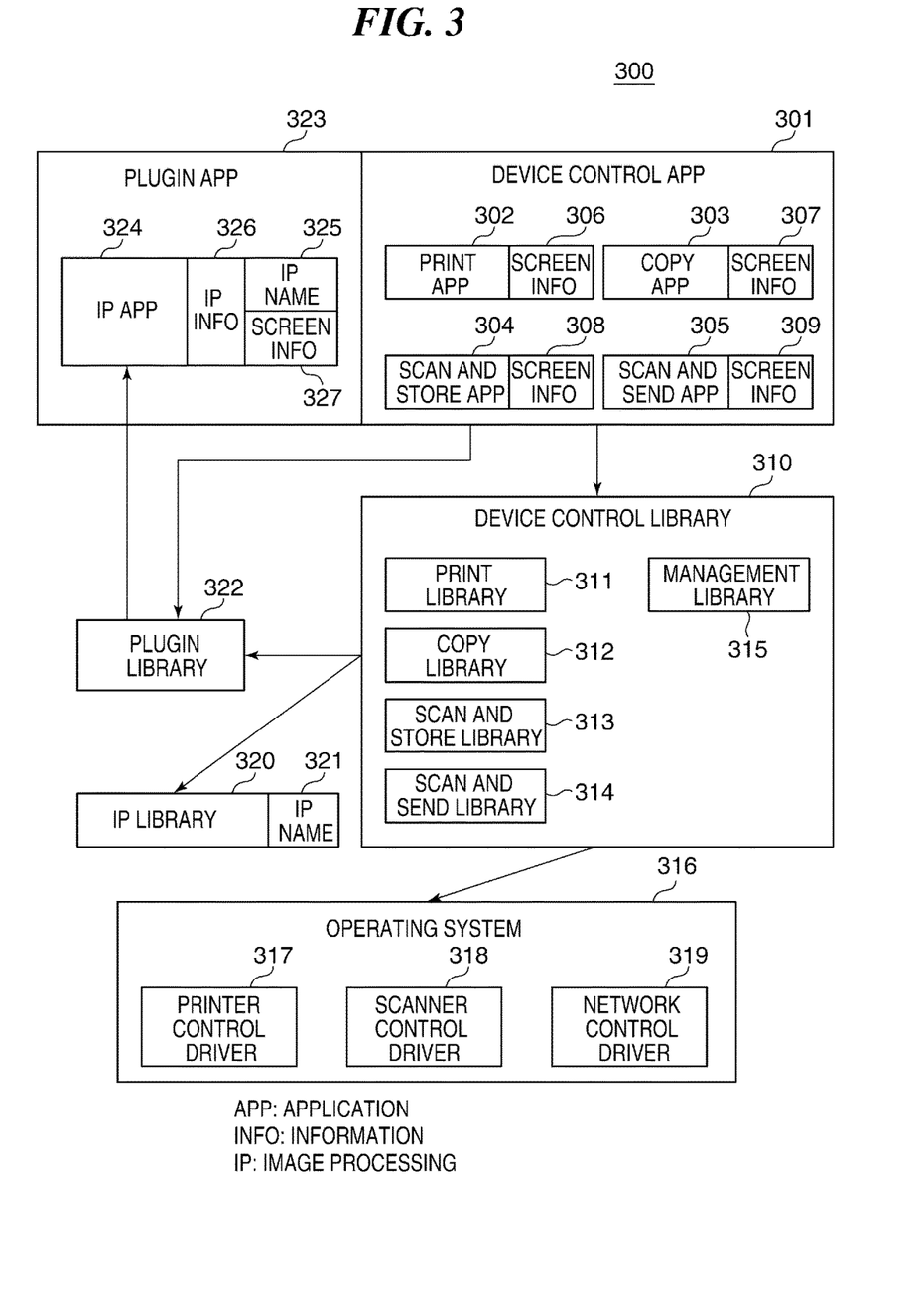
FIG. 3 is a block diagram schematically showing a configuration of software modules of the MFP shown in FIG. 1.

FIG. 3 is a block diagram schematically showing a configuration of the software module 300 of the MFP 101 shown in FIG. 1. It should be noted that "APPLICATION", "INFORMATION", and "IMAGE PROCESSING" are respectively abbreviated to "APP", "INFO", and "IP" in FIG. 3 due to space problems.

As shown in FIG. 3, the software module 300 is provided with a device control application 301, a device control library module 310, and an operating system module 316. Moreover, the software module 300 is provided with an image-processing library module 320, a plugin library module 322, and a plugin application 323. The device control application 301 provides a plurality of permanent residence applications, such as a print application 302, copy application 303, scan-and-store application 304, and scan-and-send application 305. The device control library module 310 is provided with a print library module 311, copy library module 312, scan-and-store library module 313, scan-and-send library module 314, and management library module 315. The operating system module 316 is provided with a printer control driver module 317, scanner control driver module 318, and network control driver module 319. The plugin application 323 is provided with an image processing application (image processing unit) 324.

The software module 300 consists of a plurality of layers including a first layer, second layer, and third layer. The first layer is provided with the device control application 301 and plugin application 323. The second layer is provided with the device control library module 310, image-processing library module 320, and plugin library module 322. The third layer is provided with the operating system module 316. In the embodiment, each process of the MFP 101 is usually performed when each module in the first layer gives an instruction to each module in the second layer and each module of the second layer gives an instruction to each module of the third layer.

The device control application 301 instructs the plugin library module 322 or the device control library module 310 to execute each process. For example, the device control application 301 requests transmission of information about the image processing application 324 from the plugin application 323 through the plugin library module 322. The information about the image processing application 324 includes an image process name 325 and screen information 327, for example. Moreover, the device control library module 310 performs a job by calling an API (Application Programming Interface) of the device control application 301 using a resident application.

The print application 302 performs a print job by calling the API of the print library module 311. The print job consists of a series of processes including a process that converts data received from the server 105 into print data and a process that prints according to the print data. The copy application 303 performs a copy job by calling the API of the copy library module 312. The copy job consists of a series of processes including a process that the scanner 210 reads an original and generates image data and a process that the printer 209 prints according to the image data.

The scan-and-store application 304 performs a scan-and-store job by calling the API of the scan-and-store library module 313. The scan-and-store job consists of a series of processes including a process that the scanner 210 reads an original and generates image data, a process that converts the image data into print data or data in a general-purpose format, and a process that stores the converted data into the HDD 203 etc. Data in a general-purpose format is convertible without newly installing an extension application. Specifically, general-purpose formats include PDF (Portable Document Format), JPEG (Joint Photographic Experts Group), TIFF (Tagged Image File Format), and XPS (XML Paper Specification).

The scan-and-send application 305 performs a scan-and-send job by calling the API of the scan-and-send library module 314. The scan-and-send job consists of a series of processes including a process that the scanner 210 reads an original and generates image data, a process that converts the image data into data in a general-purpose format, and a process that sends the converted data to the client PCs 103 and 104 through the network I/F 204. In the embodiment, the print application 302, copy application 303, scan-and-store application 304, and scan-and-send application 305 are provided with sets of screen information 306 through 309, respectively. The sets of screen information 306 through 309 are used for displaying the screens for receiving the execution instructions of a print job, copy job, scan-and-store job, and scan-and-send job, etc. through the operation unit 211 of the MFP 101. Since the sets of screen information 306 through 309 have the same configuration in the embodiment, the configuration of the screen information 309 about the scan-and-send application 305 will be described hereinafter as an example.

Figure 4:
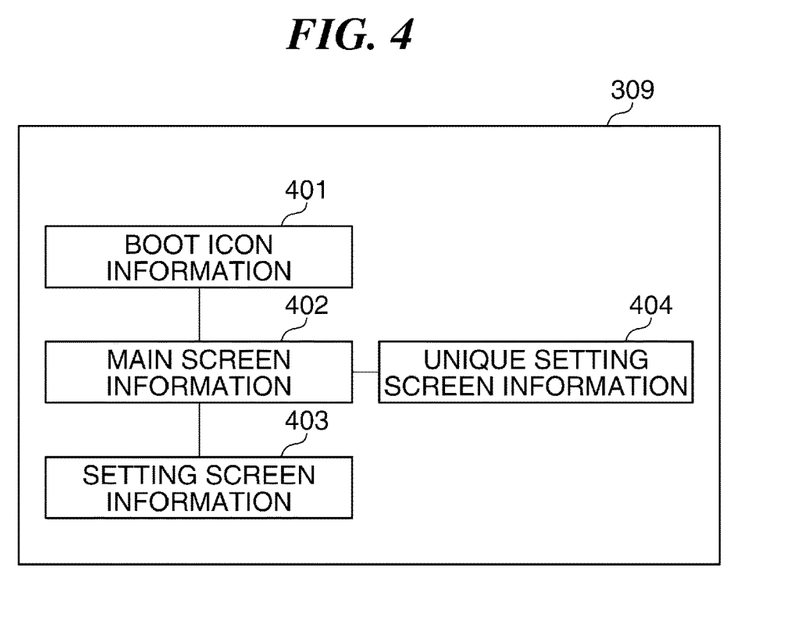
FIG. 4 is a block diagram schematically showing a configuration of screen information used by a scan-and-send application in FIG. 3.
Figure 5:
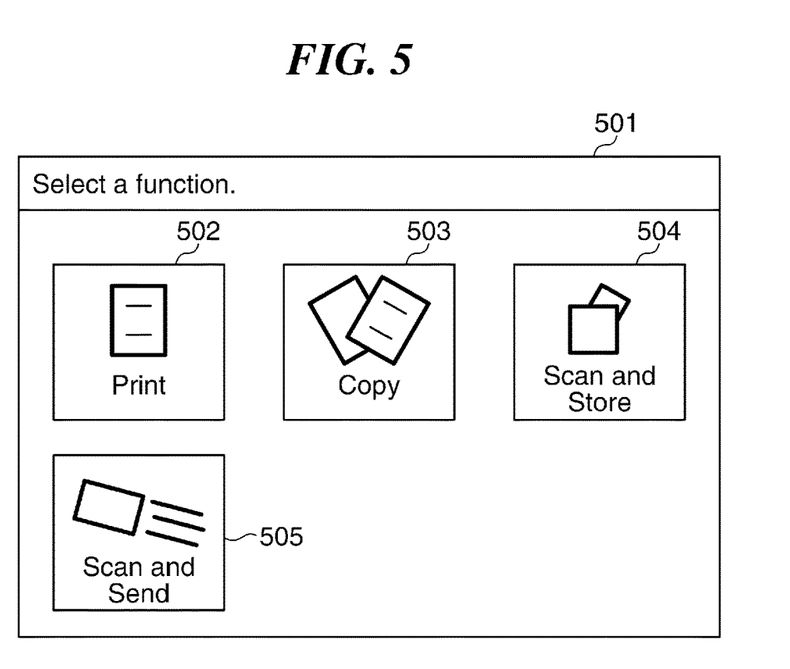
FIG. 5 is a view showing an example of a function selection screen displayed on an operation unit in FIG. 2.

The screen information 309 includes boot icon information 401, main screen information 402, setting screen information 403, and unique setting screen information 404 as shown in FIG. 4. The boot icon information 401 is needed for displaying an icon that is used to start the scan-and-send application 305. The main screen information 402 is needed for displaying a function selection screen that makes a user select a job from among a print job, copy job, scan-and-store job, and scan-and-send job. In the embodiment, a function selection screen 501 shown in FIG. 5 is displayed on the operation unit 211 on the basis of sets of the boot icon information 401 and sets of the main screen information 402 about all the resident applications of the device control application 301, when the MFP 101 starts, for example. The function selection screen 501 includes icons 502 through 505 respectively corresponding to the print application 302, copy application 303, scan-and-store application 304, and scan-and-send application 305. When a user selects one of the icons 502 through 505 in the function selection screen 501, the MFP 101 starts the resident application corresponding to the selected icon.

Figure 6:
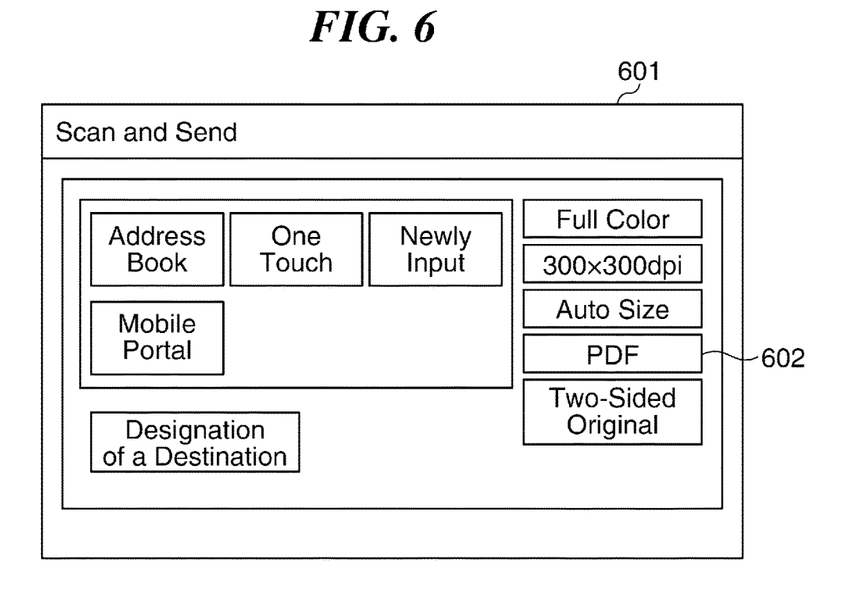
FIG. 6 is a view showing an example of a setting screen displayed on the operation unit in FIG. 2.
Figure 7:
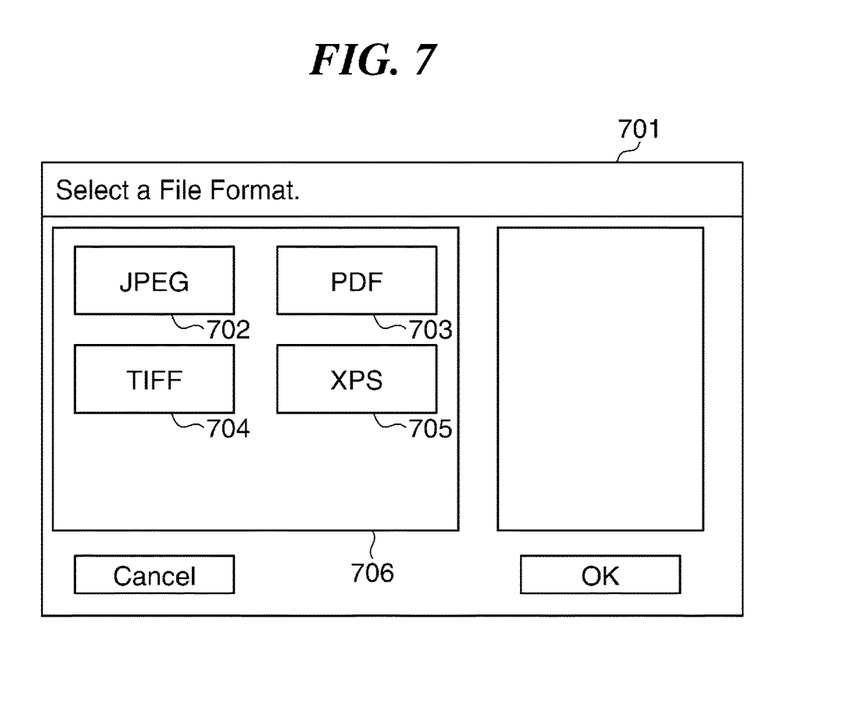
FIG. 7 is a view showing an example of a format selection screen displayed on the operation unit in FIG. 2.

The setting screen information 403 is needed for displaying a setting screen that is used to set up the image process. The unique setting screen information 404 is needed for displaying a setting screen that is used to set up a scan-and-send job. In the embodiment, the MFP 101 displays a setting screen 601 shown in FIG. 6 on the operation unit 211 on the basis of the unique setting screen information 404 of the scan-and-send application 305, when the user selects the icon 505 in the function selection screen 501, for example. The setting screen 601 includes a plurality of setting buttons including a format setting button 602. The format setting button 602 is used to set up an output format of image data generated (converted) when the scanner 210 scans. When the user selects the format setting button 602, a format selection screen 701 shown in FIG. 7 is displayed on the operation unit 211 on the basis of the unique setting screen information 404 of the scan-and-send application 305. The format selection screen 701 includes icons 702 through 705. The number of icons that can be displayed in a display area 706 of the format selection screen 701 is restricted on the basis of the display upper limit beforehand stored in the HDD 203. The icons 702 through 705 respectively correspond to types of the general-purpose formats. Specifically, the icon 702 corresponds to JPEG, the icon 703 corresponds to PDF, the icon 704 corresponds to TIFF, and the icon 705 corresponds to XPS. When the user selects one of the icons 702 through 705 in the format selection screen 701, the format corresponding to the icon that is selected by the user is set up as the output format.

The device control library module 310 instructs the plugin library module 322 and the image-processing library module 320 to execute the image process by designating a desired image process name in response to the instruction received from the device control application 301. Moreover, the device control library module 310 controls the operating system module 316 in response to the instruction received from the device control application 301.

The print library module 311 provides an API that controls a print job using the function of the printer control driver module 317. The copy library module 312 provides an API that controls a copy job using the functions of the printer control driver module 317 and scanner control driver module 318. The scan-and-store library module 313 provides an API that controls a scan-and-store job using the function of the scanner control driver module 318. The scan-and-send library module 314 provides an API that controls a scan-and-send job using the functions of the scanner control driver module 318 and network control driver module 319. The management library module 315 holds and manages the information about the configuration of the MFP 101. The information about the configuration of the MFP 101 includes information about a finisher that staples printed sheets or punches holes in the printed sheets, and list information about function validated by software license, for example.

The operating system module 316 manages execution of a program, and manages the memories, such as the RAM 202. The printer control driver module 317 controls the printer 209 through the printer I/F 205. The scanner control driver module 318 controls the scanner 210 through the scanner I/F 206. The network control driver module 319 controls the network I/F 204.

The image-processing library module 320 provides an API that performs the image processes by the CPU 201 in response to the execution instructions for the image processes received from the device control library module 310. The image processes by the CPU 201 include a process that converts image data into a general-purpose format, a sharpness process, and a page collection process, which are available since factory shipment. The image-processing library module 320 holds a unique image process name 321. The image process name 320 is an identifier used in a case where the device control library module 310 identifies the image-processing library module 320.

The plugin library module 322 instructs the plugin application 323 to execute the image process in response to the execution instruction for the image process received from the device control library module 310. Moreover, the plugin library module 322 sends the list information of extension applications installed on the MFP 101 to the device control application 301.

The plugin application 323 performs the processes with extension applications that were newly installed on the MFP 101. A plurality of extension applications can be installed on the MFP 101. In this embodiment, a case where the image processing application 324 is installed will be described. The image processing application 324 is an extension application that is newly installed in order to extend the function of the MFP 101. The image processing application 324 is installed by an operation of a remote UI (User Interface) etc. The remote UI is a mechanism for checking the execution situation of the job of the MFP 101 or for setting up a job by accessing the MFP 101 from a Web browser in the client PC 103 or 104 through the network I/F 204. Moreover, the image processing application 324 performs specific image processes. The specific image processes include a process that converts image data to a format other than the general-purpose formats, a skew correction process, and a translation data generation process after OCR (Optical Character Recognition), for example. It should be noted that the image processing application 324 may not be provided with the image processing function in the embodiment. For example, the MFP 101 may send the execution instruction for the image process to the server 105 that is provided with the image processing function under control of the image processing application 324, and the MFP 101 may obtain data to which the image process was applied from the server 105. The unique image process name 325 corresponding to a content of the executable image process is set up to the image processing application 324. For example, in a case where the image processing application 324 can perform the skew correction process, "TiltCorrect" showing that is set up to the image process name 325. It should be noted that a plurality of extension applications to which the same image process name is set up are never installed on the MFP 101.

Furthermore, the image processing application 324 is provided with image processing information 326 and screen information 327. The image processing information 326 includes output format names, group names, and group IDs. The output format names, such as "DOCX", "PPTX", and "JPEG XR", are names of formats that newly became convertible by installing the image processing application 324. The group names are names of groups into which the formats that newly became convertible are classified. A plurality of groups of names, such as "OFFICE document" and "JPEG format", are set up beforehand, and the formats that newly became convertible are classified into the groups according to their types in the embodiment. For example, when "DOCX" and "PPTX", which are formats of the OFFICE document, newly became convertible, the formats that newly became convertible are classified into the group "OFFICE document". Moreover, when "JPEG XR", which is a succeeding standard of "JPEG", newly became convertible, the format that newly became convertible is classified into the group "JPEG format". The group IDs are unique character strings associated with the respective group names. For example, the group ID "1" shows the group "OFFICE document", and the group ID "2" shows the group "JPEG format".

Figure 8:
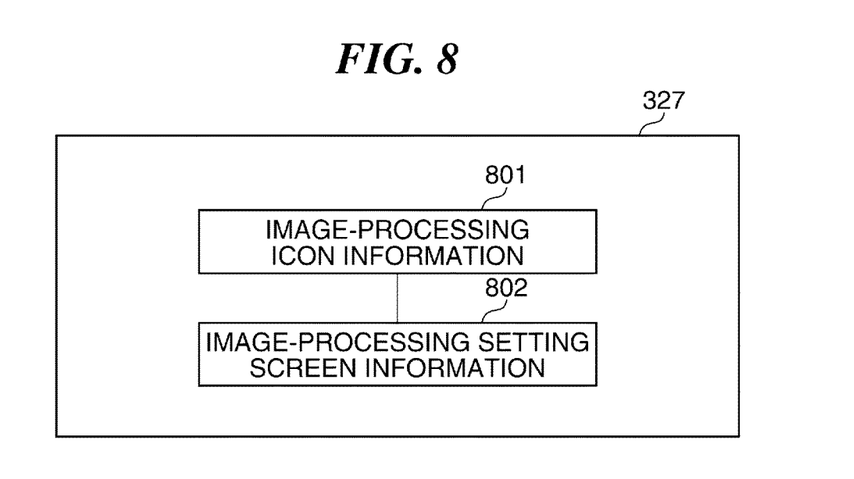
FIG. 8 is a block diagram schematically showing a configuration of screen information used by an image processing application in FIG. 3.

The screen information 327 is provided with image-processing icon information 801 and image-processing setting screen information 802 in FIG. 8, and is used when an icon of a format that newly became convertible is added to the format selection screen 701 in FIG. 7 and is displayed. The image-processing icon information 801 is needed for displaying an icon of a format that newly became convertible by installing the image processing application 324. The image-processing setting screen information 802 is needed for displaying a screen for setting up the image process.

Next, a series of processes include installation, starting, stop, and uninstallation of the image processing application 324 will be described.

First, when the image processing application 324 is installed, the CPU 201 stores the information about the image processing application 324 in the HDD 203. When a user instructs the image processing application 324 to start through a remote UI etc., the CPU 201 instructs the image processing application 324 to start. When the image processing application 324 starts, the image process by the image processing application 324 becomes executable in the MFP 101. When the user instructs the image processing application 324 to stop during execution of the image processing application 324, the CPU 201 instructs the image processing application 324 to stop. Moreover, when the user instructs the MFP 101 to uninstall the image processing application 324, the CPU 201 deletes all the information about the image processing application 324 from the HDD 203.

Incidentally, when the user selects the format setting button 602 in the MFP 101, the format selection screen 701 is displayed on the operation unit 211. The various icons 702 through 705 corresponding to the general-purpose formats are displayed on the format selection screen 701. When the image processing application 324 is installed on the MFP 101, an icon of the format that newly became convertible by installing the image processing application 324 is added to the format selection screen 701. However, the area where icons are displayed in the format selection screen 701 is limited. Accordingly, the number of icons that can be displayed on the format selection screen 701 is restricted. For example, even if a new format becomes convertible by extending the function of the MFP 101, the user may not be able to select a desired icon because the icon of the new format may not be displayed on the format selection screen 701. Against this, there is a conventional method that collects a plurality of icons into one to arrange icons properly in a format selection screen in response to a user's operation through an operation unit. However, such a method needs a user's operation for collecting the icons into one in order to properly arrange the icons on the format selection screen, which causes user's time and effort.

Corresponding to this, when the number of the icons used as displaying targets exceeds a display upper limit, the icons of the formats that newly became convertible are collected into a predetermined icon in the embodiment.

Figure 9:
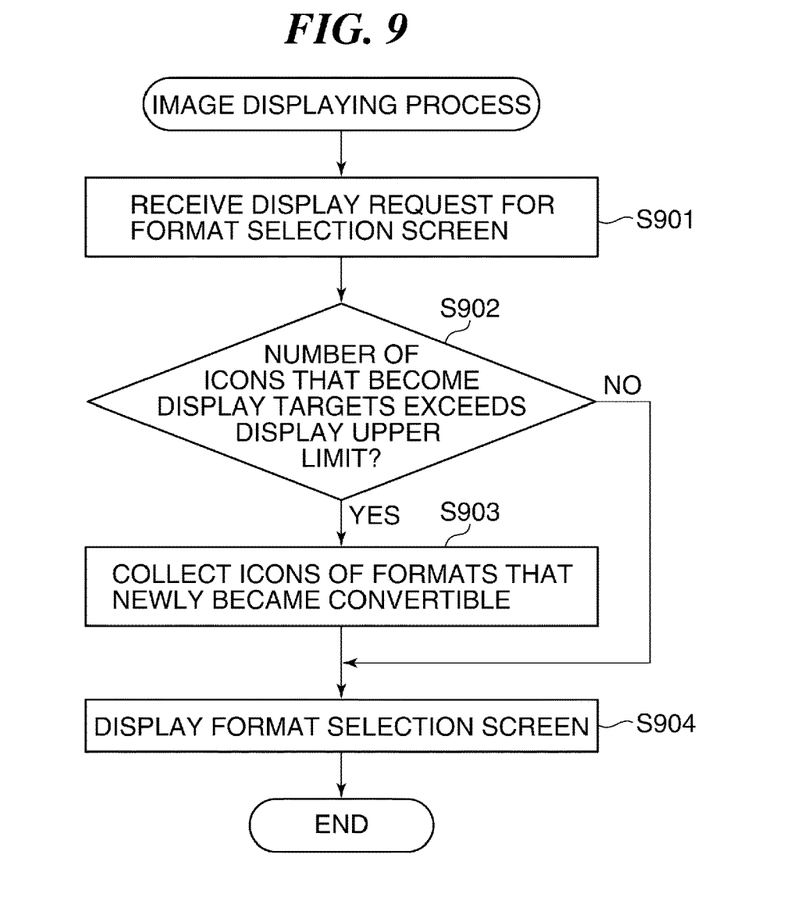
FIG. 9 is a flowchart showing a screen displaying process executed by the MFP shown in FIG. 1.

FIG. 9 is a flowchart showing a screen displaying process executed by the MFP 101 shown in FIG. 1.

The process in FIG. 9 is performed when the CPU 201 runs the program stored in the HDD 203. The process in FIG. 9 is premised on a case where at least one of the formats including "DOCX", "PPTX", and "JPEG XR" newly became convertible by installing the image processing application 324.

As shown in FIG. 9, the CPU 201 receives a display request of the format selection screen first (step S901). Next, the CPU 201 determines whether the number of the icons used as the displaying targets on the format selection screen exceeded the display upper limit (step S902). In the step S902, the CPU 201 derives the number of the icons used as the displaying targets by summing the number of the icons 702 through 705 on the format selection screen 701 and the number of the icons of the formats that newly became convertible and were obtained from the image-processing icon information 801. The CPU 201 determines whether the derived number of the icons exceeds the display upper limit beforehand stored in the HDD 203.

As a result of the determination in the step S902, when the number of the icons used as the displaying target does not exceed the display upper limit, the CPU 201 controls the display of the operation unit 211. Specifically, the CPU 201 displays the format selection screen on the operation unit 211 (step S904). For example, when the formats that newly became convertible are "DOCX" and "JPEG XR", the CPU 201 displays a format selection screen 1001 shown in FIG. 10A on the operation unit 211 according to the image-processing icon information 801 obtained. The format selection screen 1001 is provided with icons 1002 and 1003 in addition to the icons 702 through 705 in FIG. 7. The icon 1002 corresponds to "DOCX" and the icon 1003 corresponds to "JPEG XR". Then, the CPU 301 finishes this process.

Figure 10B:
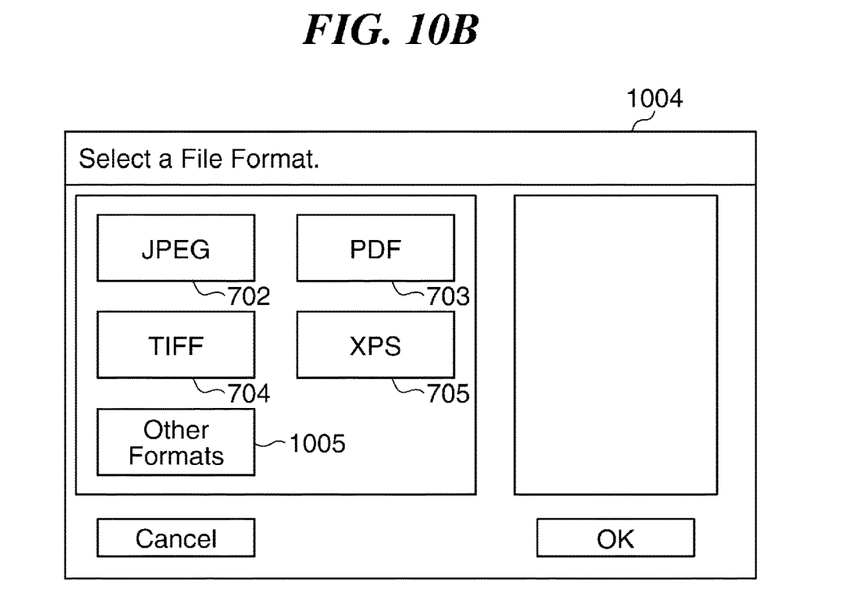
Figure 11:
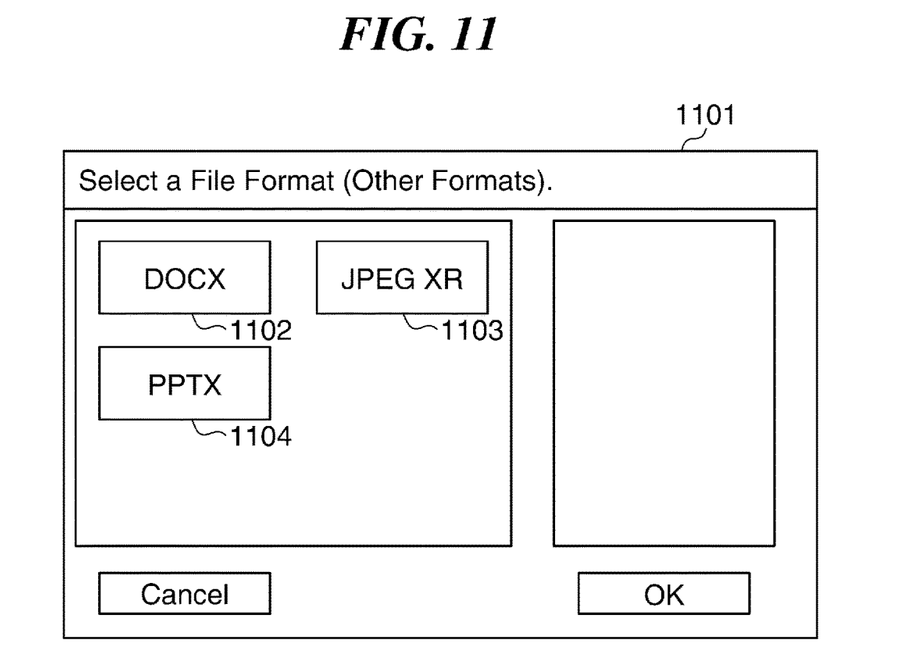
FIG. 11 is a view showing an example of a setting screen displayed on the operation unit in FIG. 2.

As a result of the determination in the step S902, when the number of the icons used as the displaying targets exceeds the display upper limit, the CPU 201 generates an icon "Other formats". After that, the CPU 201 collects the icons of the formats that newly became convertible into the icon "Other formats" (step S903), and proceeds with the process to the step S904. For example, when the formats "DOCX", "JPEG XR", and "PPTX" newly became convertible, the CPU 201 displays a format selection screen 1004 shown in FIG. 10B on the operation unit 211. The format selection screen 1004 is provided with the icon 1005 named "Other formats" in addition to the icons 702 through 705 shown in FIG. 7. When the user selects the icon 1005 of "Other formats", a selection screen 1101 shown in FIG. 11 is displayed on the operation unit 211. The selection screen 1101 is provided with icons 1102 through 1104 that respectively correspond to a plurality of formats that newly became convertible. The icon 1102 corresponds to "DOCX", the icon 1103 corresponds to "JPEG XR", and the icon 1104 corresponds to "PPTX". When the user selects one of the icons 1102 through 1104 in the format selection screen 1101, the format corresponding to the icon that is selected by the user is set up as the output format.

According to the above-mentioned process in FIG. 9, when the number of the icons used as the displaying targets exceeds the display upper limit, the icons of the formats that newly became convertible by installing the image processing application 324 are collected into the icon 1005 named "Other formats". Thereby, the icons are displayed in proper arrangement without causing user's time and effort.

Moreover, when the icon 1005 named "Other formats" is selected in the above-mentioned process in FIG. 9, the icons 1102 through 1104 that respectively corresponds to the plurality of formats that newly became convertible. This enables the user to easily select the format that newly became convertible, even if the icons are arranged properly.

Although the present invention was described with the embodiment mentioned above, the present invention is not limited to the embodiment mentioned above. For example, whenever the display request of the format selection screen is received, the process after the step S902 may be executed.

Figure 10A:
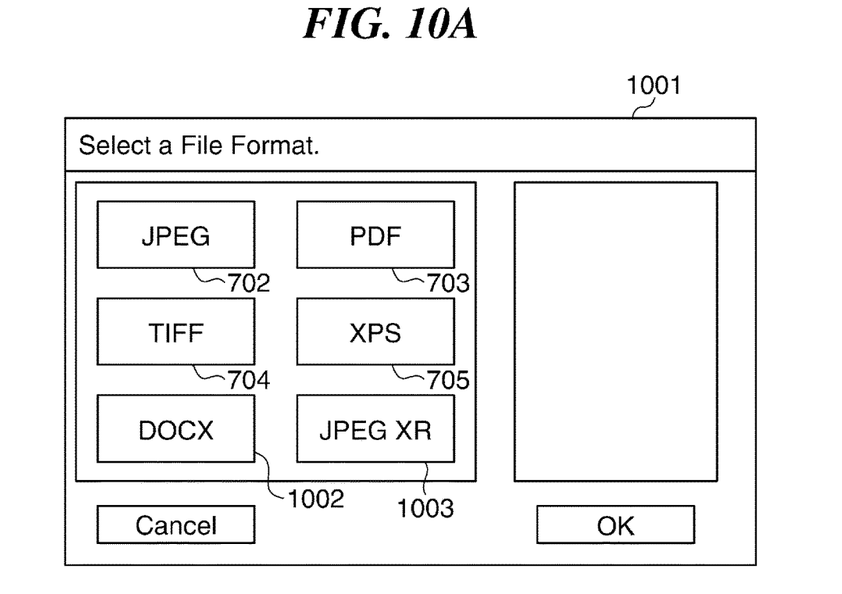
FIG. 10A and FIG. 10B are views showing examples of format selection screens displayed on the operation unit in FIG. 2.

In the embodiment mentioned above, only when the display request of the format selection screen is received first after installing the image processing application 324, the process after the step S902 may be executed and the data for displaying the format selection screen 1001 or 1004 as the execution result may be stored in the HDD 203. When the display request of the format selection screen is received after storing, the format selection screen 1001 or 1004 is displayed on the operation unit 211 on the basis of the above-mentioned data. This prevents a situation where the process that properly arranges the icons is performed more than needed, which avoids tightness of the resource of the MFP 101 during the proper arrangement of the icons.

Moreover, a plurality of extension applications may be installed in the embodiment mentioned above. As an example, a case where extension applications other than the image processing application 324 are installed so that further formats become convertible will be described. In this case, the CPU 201 obtains pieces of the image-processing icon information 801 about the image processing application 324 and the other extension applications. The CPU 201 derives the number of the icons that are the displaying targets by summing the number of the icons of the formats that newly became convertible obtained from the pieces of the image-processing icon information 801 and the number of the icons of the general-purpose formats. After that, the CPU 201 performs the process after the step S902 on the basis of the derived number of the icons.

In the embodiment mentioned above, the display upper limit of the icons in the selection screen 1101 may be set up beforehand other than the display upper limit of the icons in the format selection screen 701. When the number of the icons used as the displaying targets in the selection screen 1101 exceeds the display upper limit of the selection screen 1101, the process after the step S903 mentioned above is performed. Thereby, the icons are displayed with proper arrangement in the selection screen 1101 without causing user's time and effort.

Moreover, the icons of the formats that are classified into the same group among the formats that newly became convertible may be collected into the predetermined icon.

Figure 12:
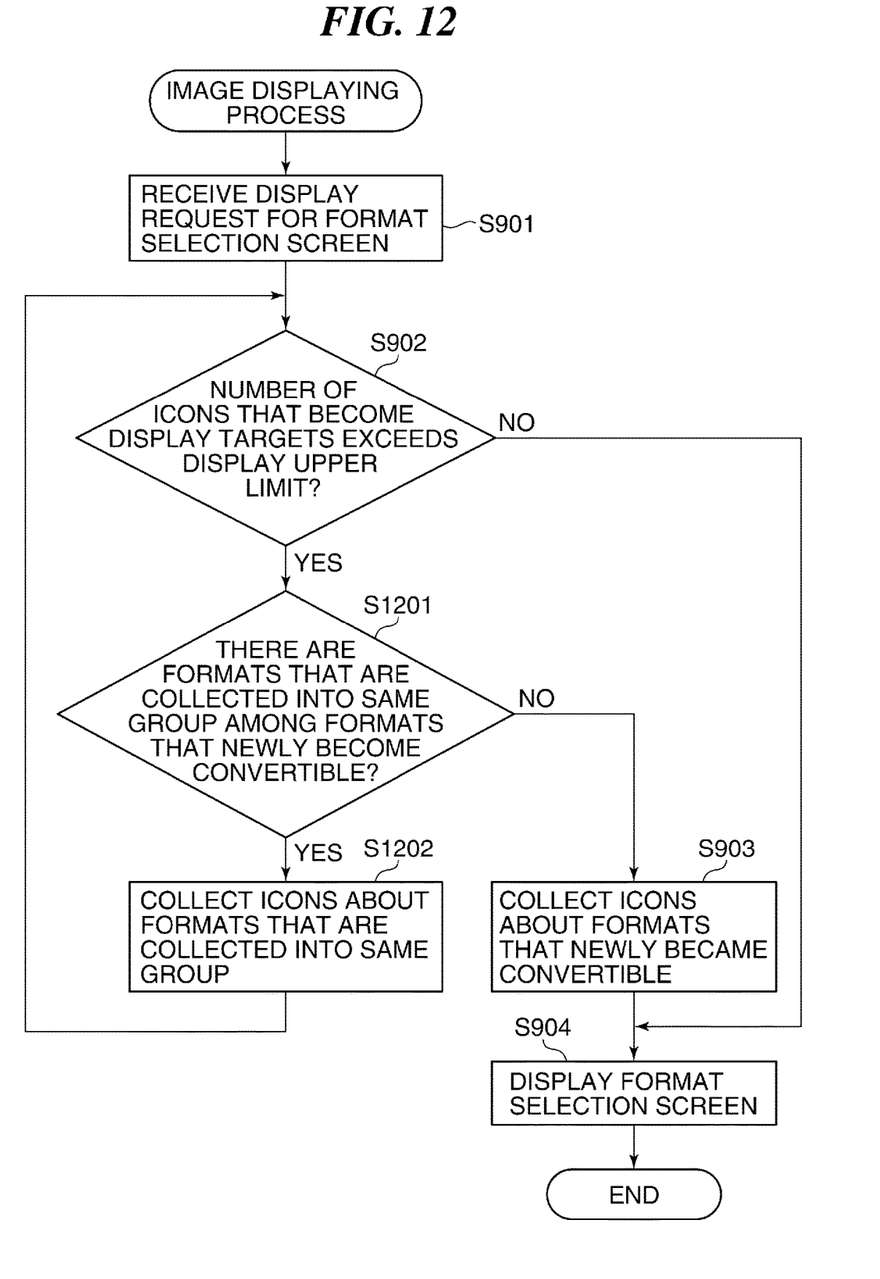
FIG. 12 is a flowchart showing procedures of a first modified example of the screen displaying process in FIG. 9.

FIG. 12 is a flowchart showing procedures of a first modified example of the screen displaying process in FIG. 9.

The process in FIG. 12 is performed when the CPU 201 runs the program stored in the HDD 203. The process in FIG. 12 is premised on a case where at least one of the formats including "DOCX", "PPTX", and "JPEG XR" newly becomes convertible by installing the image processing application 324. Moreover, the process in FIG. 12 is premised on a case where "DOCX" and "PPTX" are classified into the group "OFFICE document", and "JPEG XR" is classified into the group "JPEG format".

As shown in FIG. 12, the CPU 201 first performs the process in the steps S901 and S902.

As a result of the determination in the step S902, when the number of the icons used as the displaying targets does not exceed the display upper limit, the CPU 201 proceeds with the process to the step S904. On the other hand, as a result of the determination in the step S902, when the number of the icons used as the displaying targets exceeds the display upper limit, the CPU 201 determines whether there are a plurality of formats classified into the same group among the formats that newly became convertible on the basis of the image processing information 326 of the image processing application 324 (step S1201). For example, when the formats "DOCX", "PPTX", and "JPEG XR" newly became convertible, "DOCX" and "PPTX" are classified into the group "OFFICE document". In this case, the CPU 201 determines that there are a plurality of formats classified into the same group. On the other hand, when the formats "DOCX" and "JPEG XR" newly became convertible, "DOCX" and "JPEG XR" are classified into different groups. In this case, the CPU 201 determines that there are not a plurality of formats classified into the same group.

As a result of the determination in the step S1201, when there are not a plurality of formats classified into the same group, the CPU 201 proceeds with the process to the step S903. On the other hand, as a result of the determination in the step S1201, when there are a plurality of formats classified into the same group, the CPU 201 generates an icon of a name of a group into which the plurality of formats are classified. After that, the CPU 201 collects the icons of the formats classified into the group of the generated icon into the icon concerned (step S1202) and returns the process to the step S902. In the embodiment, when the formats "DOCX", "PPTX", and "JPEG XR" newly became convertible, for example, the CPU 201 displays a format selection screen 1301 in FIG. 13 on the operation unit 211 in the step S903. The format selection screen 1301 is provided with icons 1302 and 1303 in addition to the icons 702 through 705 in FIG. 7. The icon 1302 is generated as the group name of "OFFICE document", and the icons "DOCX" and "PPTX" are collected into the icon 1302. When the user selects the icon 1302, a selection screen (not shown) including the icons "DOCX" and "PPTX" is displayed on the operation unit 211. The icon 1303 corresponds to "JPEG XR".

Figure 13:
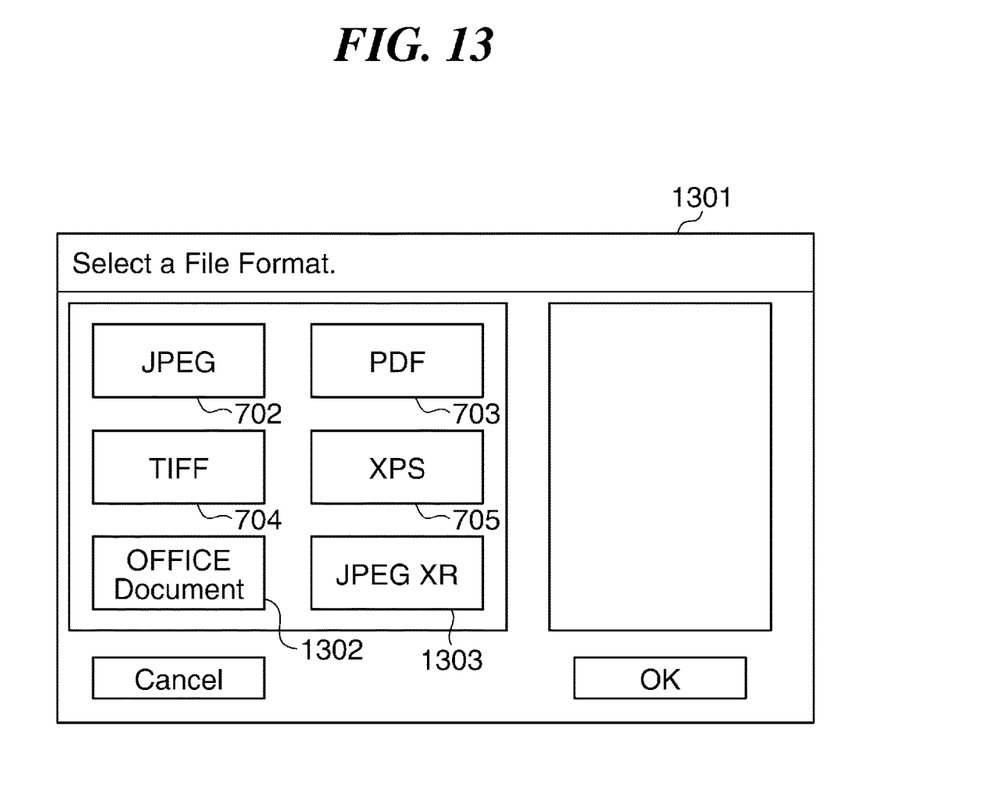
FIG. 13 is a view showing an example of a format selection screen displayed on the operation unit in the process in FIG. 12.

In the above-mentioned first modified example, the icons of the formats that are classified into the same group among the formats that newly became convertible are collected into the icon 1302. This enables to classify the formats that newly became convertible into the group so that the user selects easily. Accordingly, user's operability at the time when the user selects a desired format from among the formats that became convertible is improved.

Moreover, in the above-mentioned first modified example, the name of the group into which the icons are classified is displayed as the name of the icon 1302. This enables the user to grasp the type of the icons collected into the icon 1302 without developing the collected icons by selecting the icon 1302.

In the above-mentioned first modified example, the icon collection processes for predetermined groups may be performed in the order of the number of formats that are classified into a group until the number of the icons used as the displaying targets falls below the display upper limit.

Moreover, in the above-mentioned first modified example, icons of formats that are classified into the same group from among the formats, which include the general-purpose formats and the formats that newly became convertible by installing the image processing application 324, may be collected into a predetermined icon.

Figure 14:
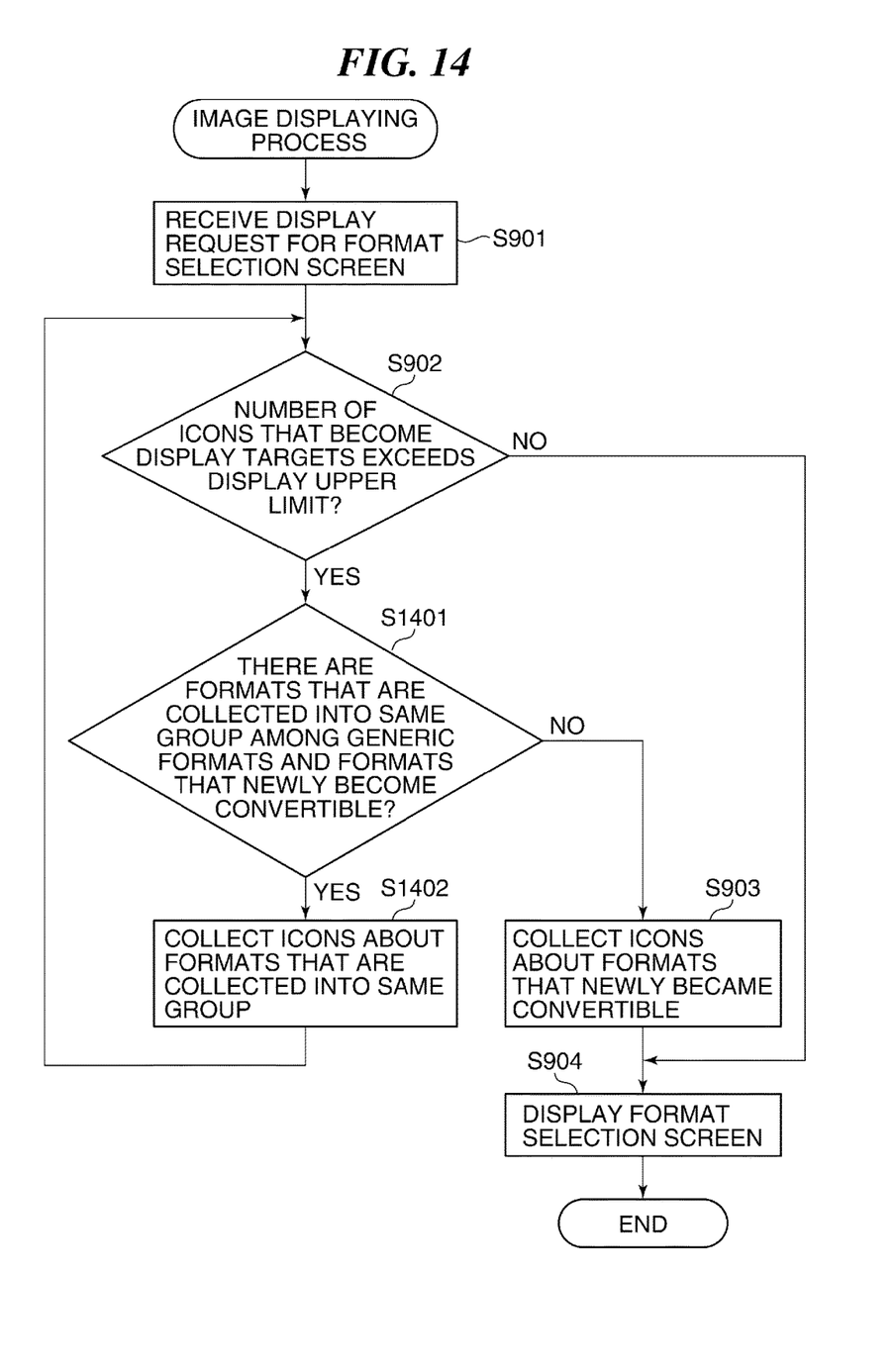
FIG. 14 is a flowchart showing procedures of a second modified example of the screen displaying process in FIG. 9.

FIG. 14 is a flowchart showing procedures of a second modified example of the screen displaying process in FIG. 9.

The process in FIG. 14 is performed when the CPU 201 runs the program stored in the HDD 203. The process in FIG. 14 is premised on a case where at least one of the formats including "DOCX", "JPEG XR", and "JPEG 200" newly becomes convertible by installing the image processing application 324. Moreover, the process in FIG. 14 is premised on a case where "DOCX" is classified into the group "OFFICE document", and "JPEG XR" and "JPEG 2000" are classified into the group "JPEG format". The process in FIG. 14 is premised on the case where the general-purpose formats are classified into either of predetermined groups, such as "OFFICE document" and "JPEG format", according to their types and "JPEG" is classified into the group "JPEG format".

As shown in FIG. 14, the CPU 201 first performs the process in the steps S901 and S902.

As a result of the determination in the step S902, when the number of the icons used as the displaying targets does not exceed the display upper limit, the CPU 201 proceeds with the process to the step S904. On the other hand, as a result of the determination in the step S902, when the number of the icons used as the displaying targets exceeds the display upper limit, the CPU 201 determines whether there are a plurality of formats classified into the same group on the basis of the unique setting screen information 404 and the image processing information 326 (step S1401). For example, when the formats "DOCX", "JPEG XR", and "JPEG2000" newly became convertible, "JPEG XR", "JPEG 2000", and "JPEG" that is a general-purpose format are classified into the group "JPEG format". In this case, the CPU 201 determines that there are a plurality of formats classified into the same group. On the other hand, when all the general-purpose formats and the formats that newly became convertible are respectively classified into different groups, the CPU 201 determines that there are not a plurality of formats classified into the same group.

As a result of the determination in the step S1401, when there are not a plurality of formats classified into the same group, the CPU 201 proceeds with the process to the step S903. On the other hand, as a result of the determination in the step S1401, when there are a plurality of formats classified into the same group, the CPU 201 generates an icon of a name of a group into which the plurality of formats are classified. After that, the CPU 201 collects the icons of the formats classified into the group of the generated icon into the icon concerned (step S1402) and returns the process to the step S902. In the second modified example, when the formats "DOCX", "JPEG XR", and "JPEG 2000" newly became convertible, the CPU 201 displays a format selection screen 1501 shown in FIG. 15 on the operation unit 211, for example. The format selection screen 1501 is provided with icons 1502 and 1503 in addition to the icons 702 through 705 in FIG. 7. The icon 1502 is generated as the group name "JPEG format", and the icons "JPEG", "JPEG XR", and "JPEG2000" are collected into the icon 1502. When the user selects the icon 1502, a selection screen (not shown) including the icons "JPEG", "JPEG XR", and "JPEG 2000" are displayed on the operation unit 211. The icon 1503 corresponds to "DOCX".

Figure 15:
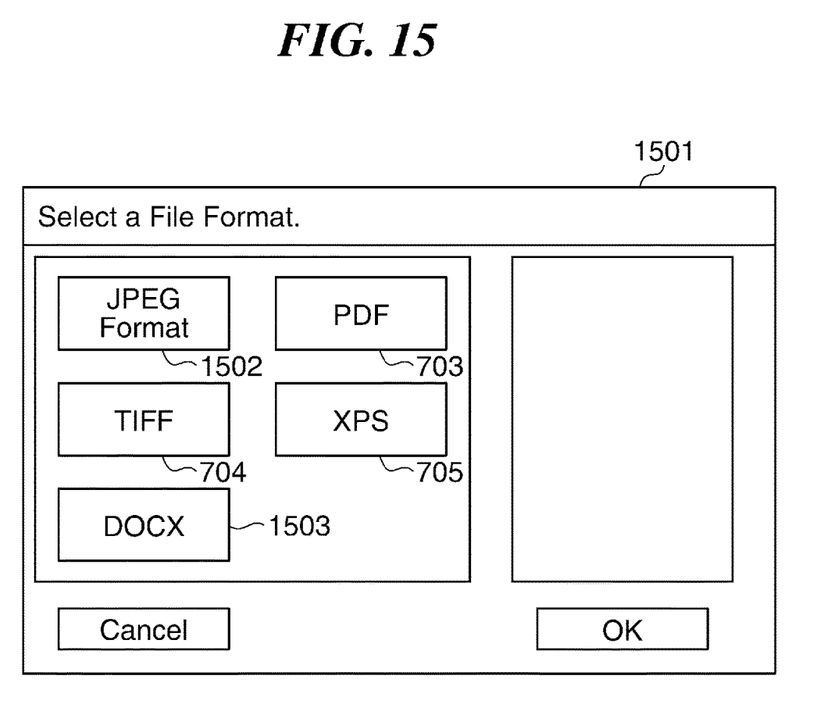
FIG. 15 is a view showing an example of a format selection screen displayed on the operation unit in the process in FIG. 14.

In the above-mentioned second modified example, a plurality of icons that correspond to a plurality of formats classified into the same group among the general-purpose formats and the formats that newly became convertible are collected into the icon 1502. Accordingly, the arrangement of the icons of not only the formats that newly became convertible but also the general-purpose formats is revised so that the user easily selects a desired icon. This improves the user's operability at the time when the user selects a desired format.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-010396, filed Jan. 24, 2017, which is hereby incorporated by reference herein in its entirety.

What is claimed is:

1. An image processing apparatus comprising:
  a scanner scanning a document and generating image data;
  a display displaying a first display area for selecting an image processing function to be executed for the image data generated by the scanner;
  a memory storing instructions; and
  at least one processor that executes the instructions causing the image processing apparatus to:
    display a plurality of standard icons corresponding to a plurality of image processing functions in the first display area;
    in a case where a plurality of extension applications are installed and a total number of the plurality of standard icons and a plurality of additional icons corresponding to the plurality of extension applications does not exceed a display upper limit of the first display area, display the plurality of standard icons and the plurality of the additional icons in the first display area; and
    in a case where the plurality of extension applications are installed and the total number of the plurality of standard icons and a plurality of additional icons corresponding to the plurality of extension applications exceeds the display upper limit of the first display area:
      display the plurality of standard icons and a predetermined icon in the first display area; and
      display a second display area on the display, in which the plurality of additional icons corresponding to the plurality of extension applications are arranged, when the predetermined icon is selected from among the icons in the first display area.

2. The image processing apparatus according to claim 1, wherein a name of a group, into which functions of the extension applications corresponding to the additional icons placed in the second display area are classified, is displayed as a name of the predetermined icon on the first display area.

3. The image processing apparatus according to claim 2, wherein an image processing function corresponding to at least one of the standard icons is also classified into the group.

4. A control method of controlling an image processing apparatus equipped with a scanner scanning a document and generating image data and a display displaying a first display area for selecting an image processing function to be executed for the image data generated by the scanner unit, the control method comprising:
  displaying a plurality of standard icons corresponding to a plurality of image processing functions in the first display area;
  in a case where a plurality of extension applications are installed and a total number of the plurality of standard icons and a plurality of additional icons corresponding to the plurality of extension applications does not exceed a display upper limit of the first display area, displaying the plurality of standard icons and the plurality of the additional icons in the first display area; and
  in a case where the plurality of extension applications are installed and the total number of the plurality of standard icons and a plurality of additional icons corresponding to the plurality of extension applications exceeds the display upper limit of the first display area:
    displaying the plurality of standard icons and a predetermined icon in the first display area; and
    displaying a second display area on the display, in which the plurality of additional icons corresponding to the plurality of extension applications are arranged, when the predetermined icon is selected from among the icons in the first display area.

5. A non-transitory computer-readable storage medium storing a control program causing a computer to execute a control method of controlling an information processing apparatus equipped with a scanner scanning a document and generating image data and a display displaying a first display area for selecting an image processing function to be executed for the image data generated by the scanner unit, the control method comprising:

displaying a plurality of standard icons corresponding to a plurality of image processing functions in the first display area;

in a case where a plurality of extension applications are installed and a total number of the plurality of standard icons and a plurality of additional icons corresponding to the plurality of extension applications does not exceed a display upper limit of the first display area, displaying the plurality of standard icons and the plurality of the additional icons in the first display area; and in a case where the plurality of extension applications are installed and the total number of the plurality of standard icons and a plurality of additional icons corresponding to the plurality of extension applications exceeds the display upper limit of the first display area:
  displaying the plurality of standard icons and a predetermined icon in the first display area; and
  displaying a second display area on the display, in which the plurality of additional icons corresponding to the plurality of extension applications are arranged, when the predetermined icon is selected from among the icons in the first display area.

* * * * *